June 8, 1965  E. WÜSTENHAGEN ETAL  3,188,072
SPRING OR DAMPING DEVICE
Filed June 17, 1963

INVENTORS
ERNST WÜSTENHAGEN
WILFRIED FERDINAND ROOS

By Shoemaker and Mattare
ATTYS.

United States Patent Office 3,188,072
Patented June 8, 1965

3,188,072
SPRING OR DAMPING DEVICE
Ernst Wüstenhagen, Koblenz, and Wilfried Ferdinand Roos, Guls (Mosel), Germany, assignors to Stabilus Industrie- und Handelsgesellschaft m.b.H., Koblenz-Neuendorf, Germany
Filed June 17, 1963, Ser. No. 288,230
Claims priority, application Germany, June 19, 1962, St 19,378
6 Claims. (Cl. 267—65)

The invention relates to a spring or damping device filled with compressed gas and/or liquid.

With such devices, there are considerable exhaust forces tending to move the piston out of its cylinder. The magnitude of these forces depends on the internal pressure and the effective surface of the piston. Such forces are undesirable in many applications of such devices.

According to the invention, there is provided a spring or damping device filled with compressed gas and/or liquid and comprising two chambers and respective displacement means acting in the two chambers, the effective surfaces of the respective displacement means being inversely proportional to the normal pressure prevailing in the chambers in which they act and the displacement forces acting in opposition whereby the device always tends to return to an equilibrium position in which the normal pressures prevail. In practice this arrangement is achieved by inserting and enclosing the filling medium in the first chamber at a pressure preferably of over 70 atmospheres absolute pressure. The filling medium is then inserted in the second chamber and the pressure in this chamber increased until there is an opposing force acting on the piston which balances the exhaust force of the first chamber.

Figure 1:
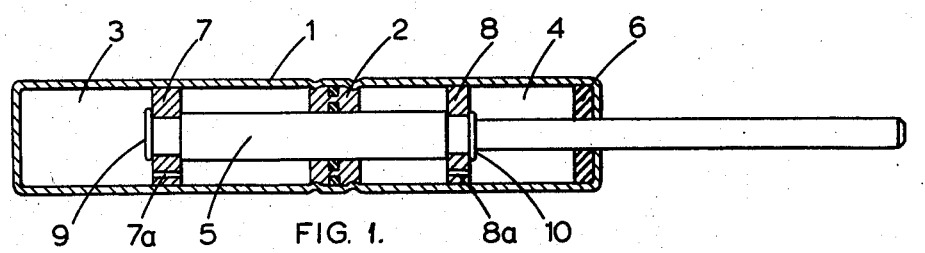
FIG. 1 is a cross-section of a damping device with the damping members fixed to the displacement piston.
Figure 2:
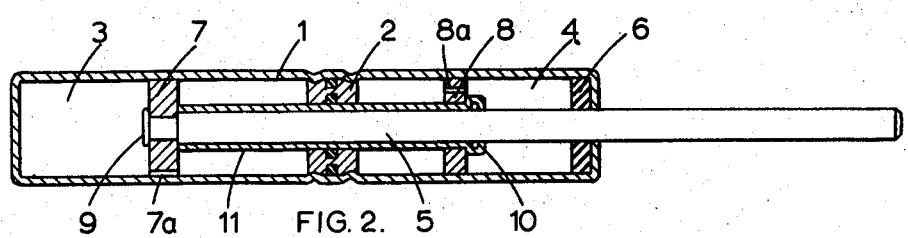
FIG. 2 is a cross-section of a damping device with the damping members fixed to the displacement piston and the sleeve.

In FIGS. 1 and 2 the pressure cylinder 1 is divided in a fluid-tight manner into two chambers 3 and 4 by the dividing member 2. A displacement piston 5 passes through the seal 6 into the pressure chamber 4 and extends through the dividing member 2 into the pressure chamber 3. Damping members 7 and 8 provided with bleed passages 7a and 8a respectively are mounted on the piston 5 in the pressure chambers 3 and 4.

The pressure $P_1$ prevailing in the chamber 3 acts on the end face 9 of the displacement piston 5 and tends to force it out of the chamber. But the pressure $P_2$ prevailing in the chamber 4 generates a counteracting force which acts on the annular face 10, formed by a reduction in the cross-section of the piston 5 within the chamber 4, and which opposes the exhaust force produced by the pressure 4, and which opposes the exhaust force produced by the pressure $P_1$. If the larger diameter of the piston is designated as $d_1$ and the smaller diameter as $d_2$, then the pressures which must prevail in the two chambers in order to produce equilibrium are as follows:

$$P_1 \cdot d_1^2 = P_2 \cdot (d_1^2 - d_2^2)$$

If this equation obtains, the forces exerted on the piston 5 due to the pressures $P_1$ and $P_2$ cancel one another out, i.e. the piston is in the position of equilibrium. If the piston is moved out of its rest position by an external force and the external force is then removed, the piston automatically returns to its position of equilibrium.

Of course it is also possible for the pressure and surfaces to be such that only part of the exhaust force is eliminated.

In FIG. 2, instead of the cross-section being reduced as in FIG. 1, the cross-section of the displacement piston 5 is enlarged by a sleeve 11 which extends through the member 2 between the two damping members 7 and 8. The sleeve can slide along the piston 5 and is arranged to seal off the chambers 3 and 4 from one another, and it also carries the damping member 8. This embodiment of the invention enables the piston 5 to move rapidly into the chamber 3 while the sleeve 11 and the damping member 8 lag behind. This will, of course, only occur if the damping member 7 has a smaller damping capacity than the member 8. In the position of equilibrium the sleeve 11 is again applied to the damping member 7 as shown in FIG. 2. However, the basic mode of operation as described with reference to FIG. 1 is not affected by this structural change.

Figure 3:
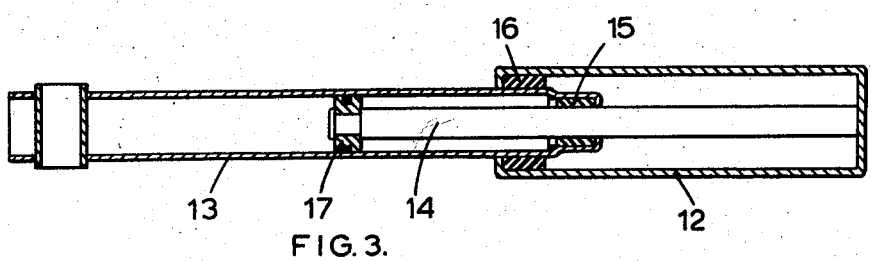
FIG. 3 is a cross-section of a damping device in which the pressure chambers are mounted for relative displacement.

In FIG. 3 the two pressure chambers 12 and 13 are mounted for relative displacement, the chamber 13 projecting into the chamber 12 as a displacement piston. A displacement piston 14 mounted concentrically inside the chamber 12 projects into the chamber 13. A seal 15 seals off the chamber 13 from the chamber 12. Another seal 16 maintains the pressure in the chamber 12. The end of the piston 14 projecting into the pressure chamber 13 is provided with a sealing element 17, which divides the chamber 13 into two fluid tight compartments.

The pressure $P_1$ in the chamber 12 acts on the annular face of the chamber 13 projecting into the pressure chamber 12 and tends to force it outwardly. The pressure $P_2$ in the chamber 13, on the side of the sealing element 17 nearest the chamber 12, acts on the free annular face of the sealing element 17. If the external diameter of the chamber 13 is designated as $d_1$, its internal diameter as $d_2$ (=diameter of sealing element 17) and the diameter of the displacement piston 14 as $d_3$, the prerequisite for equilibrium is as follows:

$$P_1 \cdot (d_1^2 - d_3^2) = P_2 \cdot (d_2^2 - d_3^2)$$

In this case too there will be no exhaust force if the pressures $P_1$ and $P_2$ satisfy the above equation.

We claim:

1. A spring or damping device filled with compressed gas and comprising two chambers, displacement means acting in the respective chambers, the displacement means comprising a single displacement piston extending through one chamber and into the other chamber and movable in each chamber, a sleeve on that part of the piston which can move from one chamber to the other chamber, the respective displacement means having surfaces which are inversely proportional to the normal pressure prevailing in the chambers in which they act and the displacement forces acting in opposition whereby the device always tends to return to an equilibrium position in which normal pressures prevail, and the displacement force applied to that end of the sleeve in the first chamber urging the piston into the second chamber.

2. A device according to claim 1, wherein damping members are operatively associated with the displacement means and positioned in each chamber, the damping members having different damping characteristics in each chamber.

3. A device according to claim 1, wherein the sleeve can slide along the piston.

4. A double-acting spring device, comprising a first hollow cylindrical member closed at one end and forming a first chamber, the other end being opened and having a seal adjacent the open end, a second hollow cylindrical member having one end portion closed and positioned in the first chamber, the second cylindrical member engaging the seal at the open end of the first cylindrical member and thus closing the first chamber, a piston in the first cylindrical member having one end engaging the closed end of the first cylindrical member, the piston rod extending through the open end of the second cylindrical member, a seal in the open end of the second cylindrical member and engaging the piston rod to seal the second member, the other end of the piston rod extending into the second cylindrical member and having a piston and seal thereon engaging the inner wall of the second member thus dividing the chamber into fluid tight compartments, compressed gas in the first chamber acting on the end of the second member, compressed gas in the compartments of the second chamber acting on the end of the chamber within the first chamber and on both sides of the seal on the piston, the gas in the compartments being at a pressure different from that in the first chamber when the spring is in unstressed condition, the gas pressures in the respective chambers and the dimensions of the surfaces being acted upon by the compressed gases in the chambers being selected so that the force exerted thereupon is normally balanced in the respective chambers.

5. A device according to claim 1 wherein the pressure in at least one of the chambers is over 70 atmospheres absolute.

6. A device according to claim 4 wherein the pressure in at least one of the chambers is over 70 atmospheres absolute.

References Cited by the Examiner

UNITED STATES PATENTS

| | | | |
|---|---|---|---|
| 2,101,757 | 12/37 | Schumacher | 267—64 |
| 2,743,741 | 5/56 | Ord | 267—64 |
| 2,852,247 | 9/58 | Prescott | 267—64 |
| 2,985,443 | 5/61 | Smith | 267—1 |
| 3,012,770 | 12/61 | Kendall | 267—64 |
| 3,094,317 | 6/63 | Axthammer | 267—64 |
| 3,098,644 | 7/63 | Phillips | 267—1 |

FOREIGN PATENTS 1,152,579   8/63   Germany.

ARTHUR L. LA POINT, *Primary Examiner.*